United States Patent [19]

Main et al.

[11] 3,775,159

[45] Nov. 27, 1973

[54] METHOD FOR PROCESSING COILED TUBING HAVING TURNS PREBENT TO VARYING RADII OF CURVATURE

[75] Inventors: George Main, Garfield Heights; Robert E. Jahnke, Fairview Park, both of Ohio

[73] Assignee: Republic Steel Corporation, Cleveland, Ohio

[22] Filed: Nov. 30, 1971

[21] Appl. No.: 203,491

Related U.S. Application Data

[62] Division of Ser. No. 8,369, Feb. 3, 1970, Pat. No. 3,690,288.

[52] U.S. Cl.......................... 117/75, 117/94, 118/6, 118/325, 118/405
[51] Int. Cl. .......................... B05c 11/12, B05c 5/02
[58] Field of Search .................. 134/14; 117/94, 75; 118/8, 6; 226/20, 168

[56] References Cited
UNITED STATES PATENTS

| | | | |
|---|---|---|---|
| 3,278,330 | 10/1966 | De Vau | 117/94 |
| 3,104,789 | 9/1963 | Fife | 118/6 X |
| 3,232,547 | 2/1966 | Thiede et al. | 226/20 X |
| 3,615,048 | 10/1971 | Martin | 226/20 |
| 3,439,851 | 4/1969 | Rum et al. | 226/168 X |
| 3,500,877 | 3/1970 | Lingen et al. | 226/168 X |
| 3,501,347 | 3/1970 | Kenmore | 134/14 |

*Primary Examiner*—Ralph Husack
*Attorney*—Robert P. Wright et al.

[57] ABSTRACT

Method and apparatus for processing coiled tubing or other material having turns prebent to varying radii of curvature without unbending the tubing. A coil of tubing is rotatably supported and the turns of tubing from the coil are sequentially separated axially of the coil. The axially separated tubing is guided into and through a processing station. The tubing is maintained on a predetermined path through the processing station by sensing deviation of the tubing from the predetermined path and then directing the tubing into the path in response to the sensed deviation. The trailing end of the tubing is sensed as it passes through the processing station, and further directing of the tubing is discontinued.

The natural fall of the coil is utilized by spacing the processing station from the apparatus for rotatably supporting the coil in order to reduce the mechanical effort of feeding the tubing through the processing station. The processing station additionally is set at an angle that coincides with the normal fall of the separated coil turns, further to facilitate the movement of the turns through the processing station. Tapered support rollers are utilized for supporting the coil prior to processing, the taper being such as to accomodate the difference in linear velocity of the tubing occasioned by the varying radii of curvature of the turns. The tubing is recoiled in a rotatable receiving drum spaced beneath the processing station. The processed tubing moves directly to the receiving drum without contact with any support or guiding structure to provide a minimum of handling after processing.

7 Claims, 10 Drawing Figures

United States Patent [19]
Main et al.
[11] 3,775,159
[45] Nov. 27, 1973
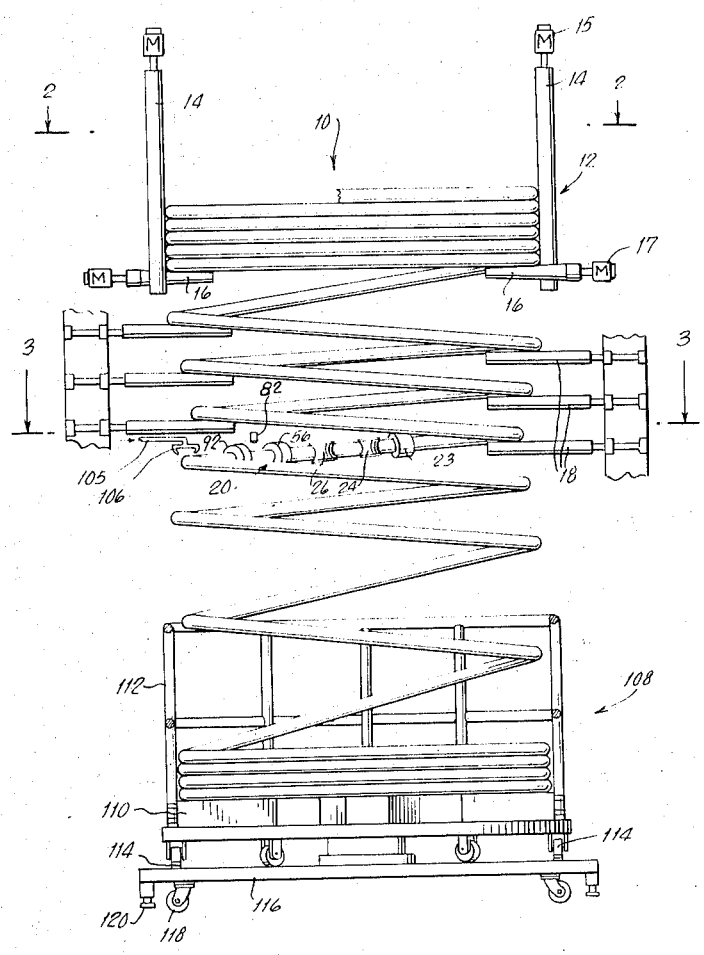

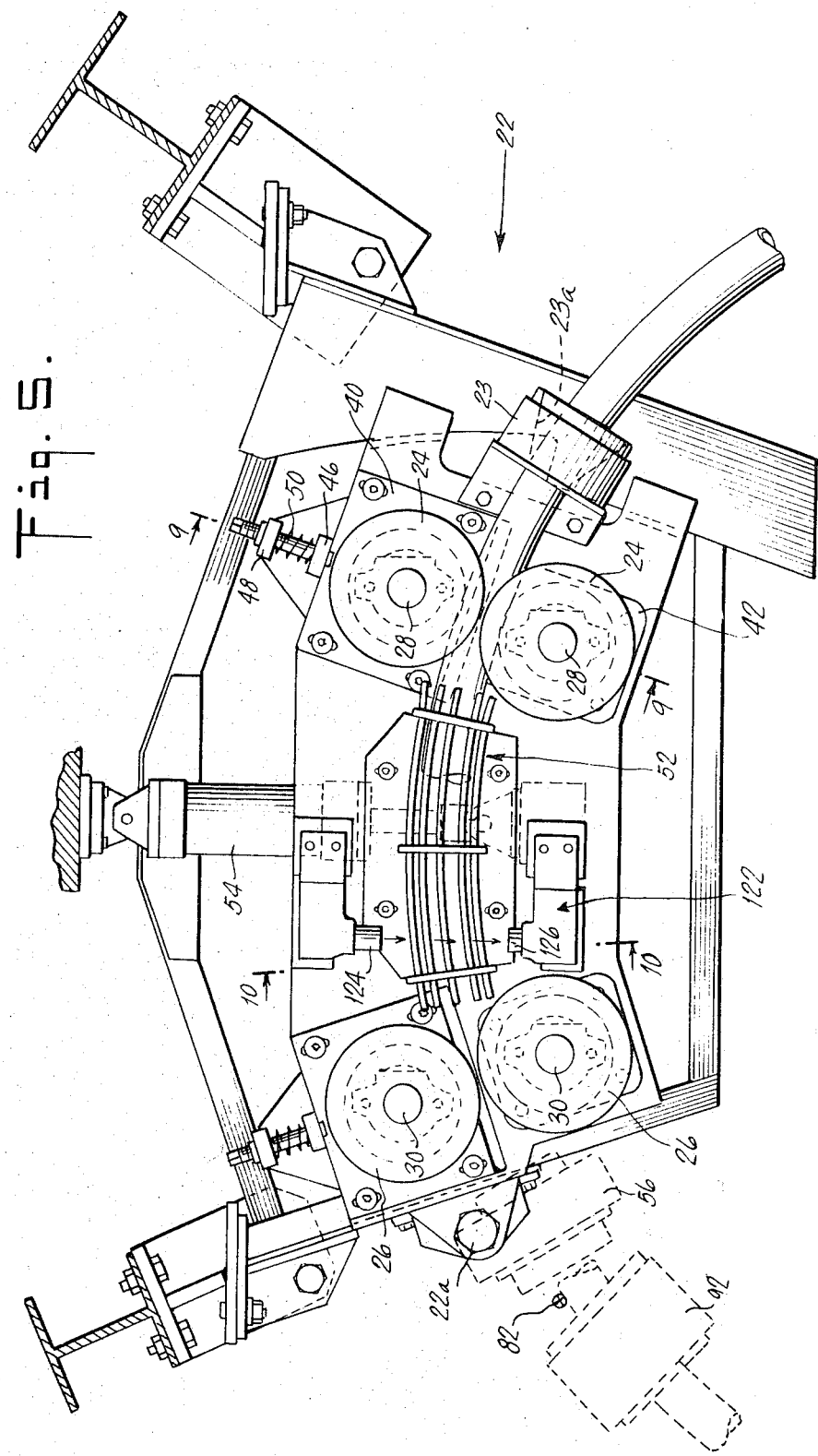

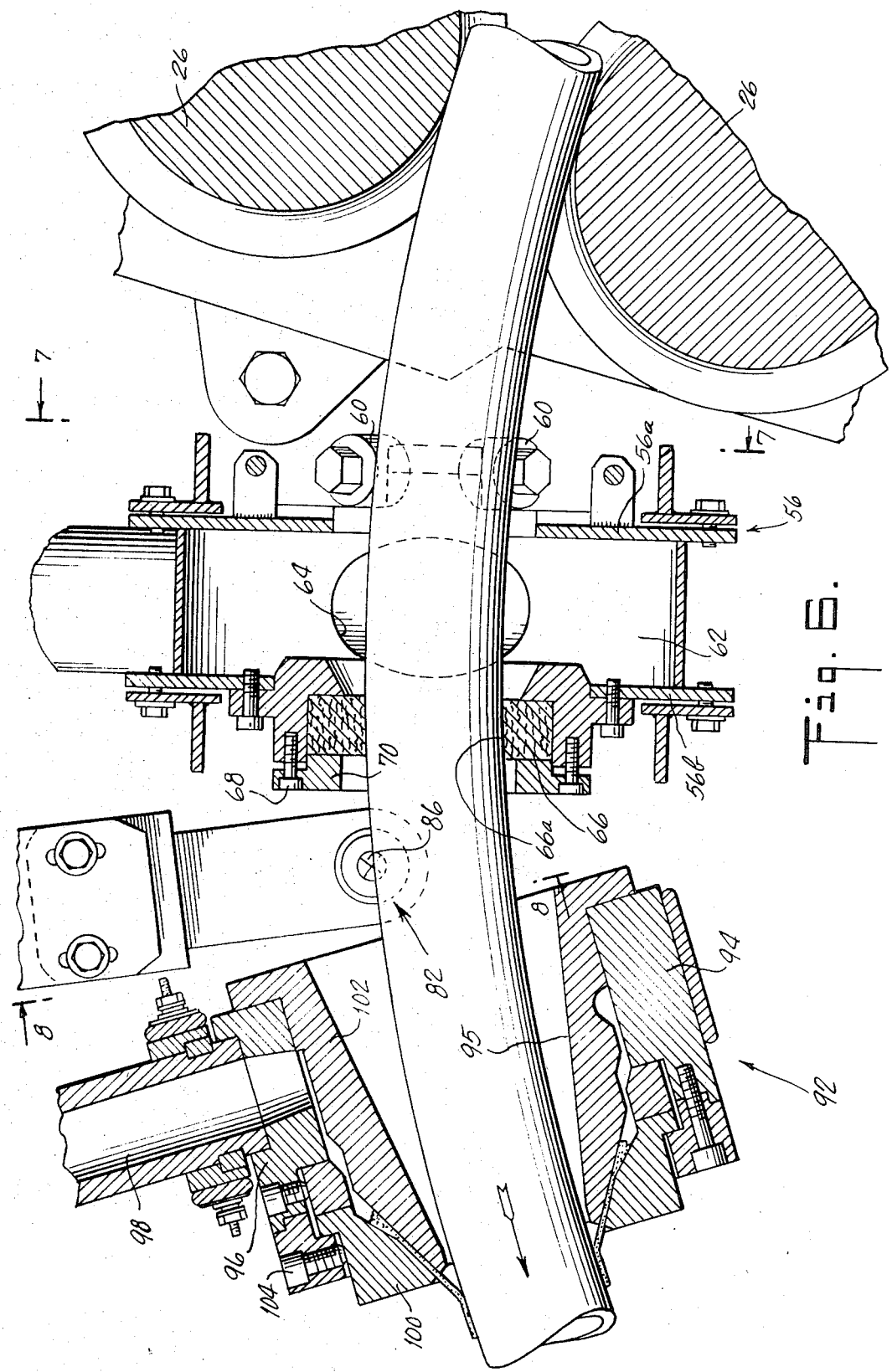

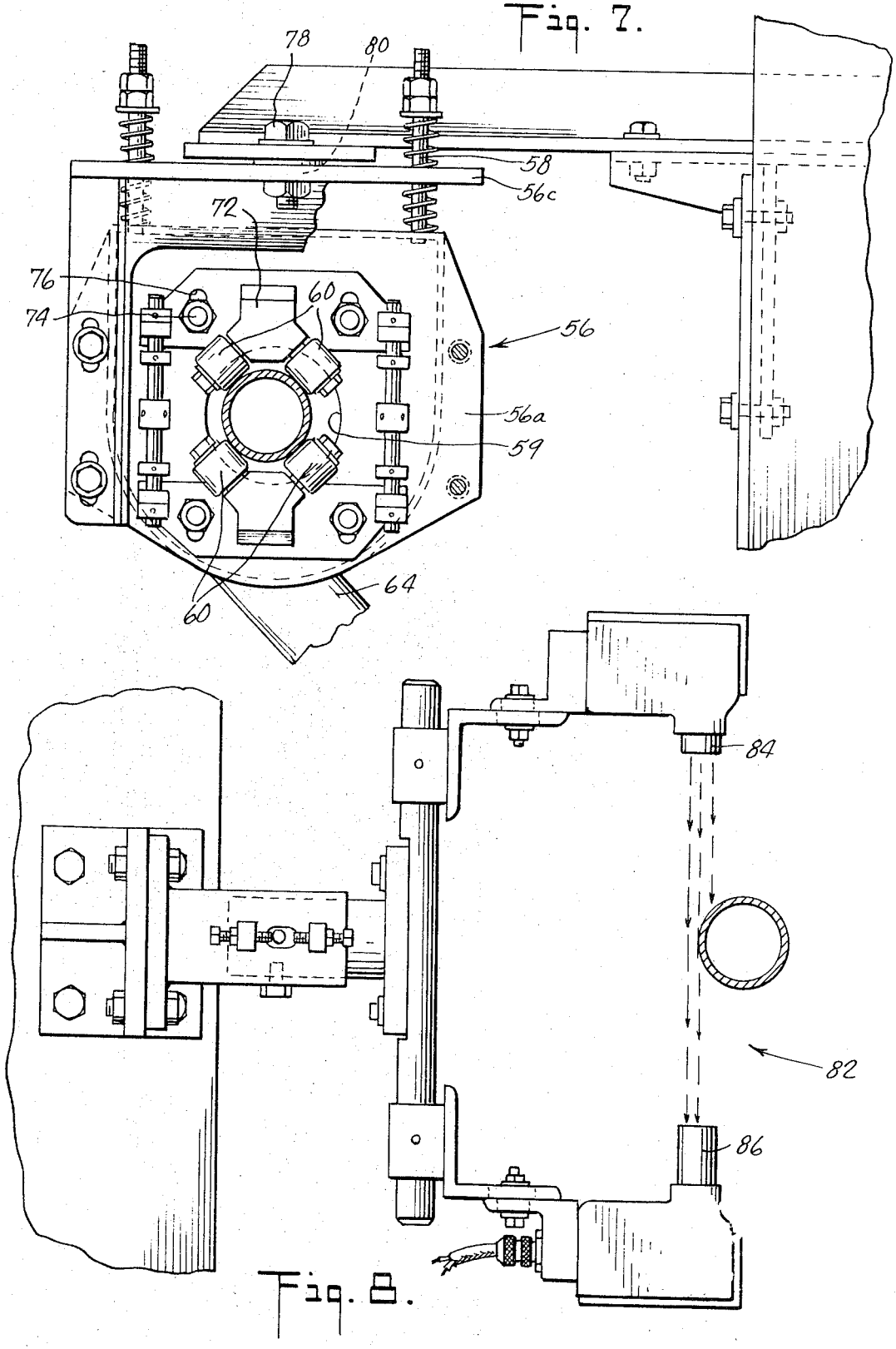

METHOD FOR PROCESSING COILED TUBING HAVING TURNS PREBENT TO VARYING RADII OF CURVATURE

CROSS REFERENCE TO RELATED APPLICATION

This application is a division of our co-pending U.S. Pat. application Ser. No. 8,369, filed Feb. 3, 1970 for METHOD AND APPARATUS FOR PROCESSING COILED TUBING HAVING TURNS PREBENT TO VARYING RADII OF CURVATURE, now U.S. Pat. No. 3,690,288 issued Sept. 12, 1972.

BACKGROUND OF THE INVENTION

The invention relates to method for processing, e.g., coating, a continuous length of coiled tubing having turns prebent to varying radii of curvature.

Tubing and the like is most easily and economically handled in coils, frequently containing in excess of 1,000 feet of tubing. Steel tubing, in particular, often needs to be prebent when placed in coil form in order to retain the coil shape. The individual turns of such a coil will vary in radius os curvature depending upon the position of the turn in a layer of the coil.

In the processing of such tubing, e.g., to coat the tubing with plastic, it is undesirable to uncoil and straighten the tubing and then re-bend and re-coil it. In DeVau et al. U.S. Pat. No. 3,278,330 this problem is overcome in the coating of coiled tubing by rotatably supporting the coil, separating turns from the coil in a direction axial of the coil while continuously rotating the coil on its axis, passing the axially separated tubing into and through a plastic applying zone, and passing the coated turns into a rotatable receiving drum.

The coating apparatus of De Vau et al. does not, without change, accommodate prebent tubing with varying radius of curvature. In particular, De Vau's tube feeding arrangements are fixed during any operation, and hence tubing of varying radius of curvature might be bent as it is processed, an undesirable rasult. At the least, if not bent to conform to a fixed radius of curvature, such tubing would be directed in varying directions depending upon the curvature of the tubing.

SUMMARY OF THE INVENTION

An object of the invention is to provide method for maintaining coiled tubing that is prebent to varying radii of curvature on a predetermined path through a processing station without changing the form of the coil or curvature of the turns.

Another object is to continuously maintain the tubing on a predetermined path only until the trailing end of the tubing passes through the processing station.

Another object of the invention is to utilize the natural fall of separated turns from a coil to aid in the passage of the separated turns through a processing station.

To these and other ends, the instant invention contemplates method for processing coiled tubing having turns prebent to varying radii of curvature without requiring unbending of the tubing. A coil of tubing is rotatably supported while turns are separated sequentially from the coil in a direction axial of the coil as it is rotated about its axis. Tapered suport rolls may be employed to accommodate the varying linear velocities of the turns occasioned by the varying radii of curvature of the turns. The axially separated tubing is guided into and through a processing station. The tubing is continuously maintained on a predetermined path through the processing station until the trailing end of the tubing passes therethrough.

In accordance with the invention, a turn of axially separated tubing is guided into and through a processing station wherein, e.g., an adhesive undercoat and a plastic overcoat are applied thereto. Deviation of the tubing from the predetermined path is sensed at a location between the places at which the undercoat and overcoat are applied to the tubing. This is performed by means of a photocell responsive to the amount of light directed at it, which light is partially blocked by the moving tubing. In response to the sensed deviation, i.e., by changes in the amount of light, the tubing is continuously directed into the predetermined path by a fluid cylinder and piston mechanism which moves a tubing guide mechanism.

A second sensing device detects the trailing end of the tubing before it reaches the place at which the undercoat is applied. Upon determining passage of the trailing end, the means for directing the tubing into the predetermined path is overridden and secured against further movement. The second sensing device may include a photocell which is normally blocked from receiving light by the tubing.

The natural fall of the separated turns of tubing from the coil to processing is utilized to aid in the passage of the separated turns through the processing station. Additionally, the processing station is inclined at an angle that corresponds with the natural fall of the separated turns to better receive the tubing. Following the processing, the natural fall of separated turns is again utilized. In particular, all contact either by guiding or supporting mechanism is avoided until the processed tubing is positioned within a rotatable coiling drum to provide a minimum of handling after processing.

BRIEF DESCRIPTION OF THE DRAWINGS

FIG. 5 is a detailed plan view of representative guide means in accordance with the present invention.

FIG. 6 is a detailed plan view, partly in section, of a representative tubing processing station.

FIG. 7 is a sectional view taken along the line 7—7 of FIG. 6.

FIG. 8 is a sectional view taken along the line 8—8 of FIG. 6.

DETAILED DESCRIPTION

Figure 1:
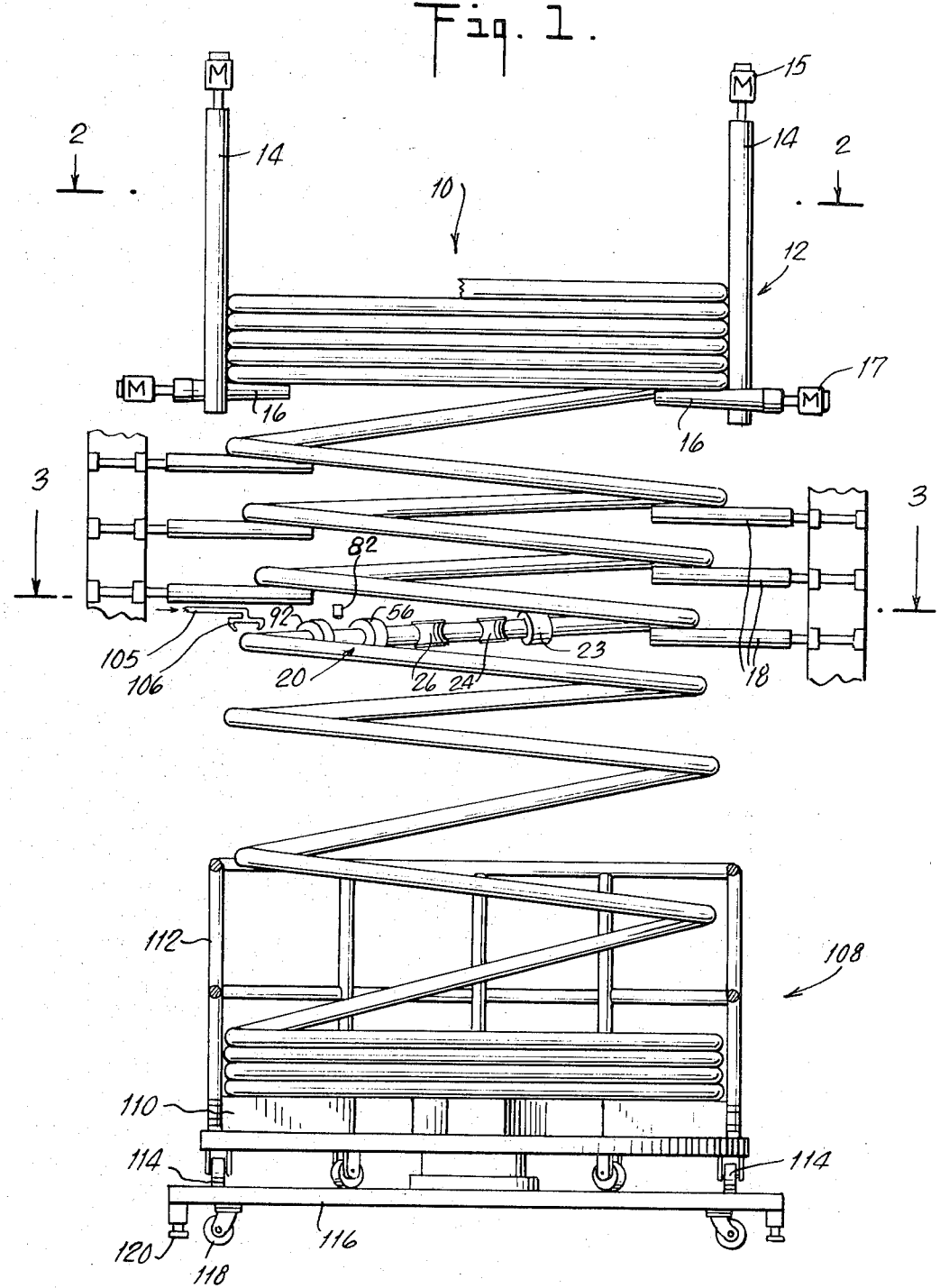
FIG. 1 is an elevational view of representative apparatus in accordance with the present invention.
Figure 2:
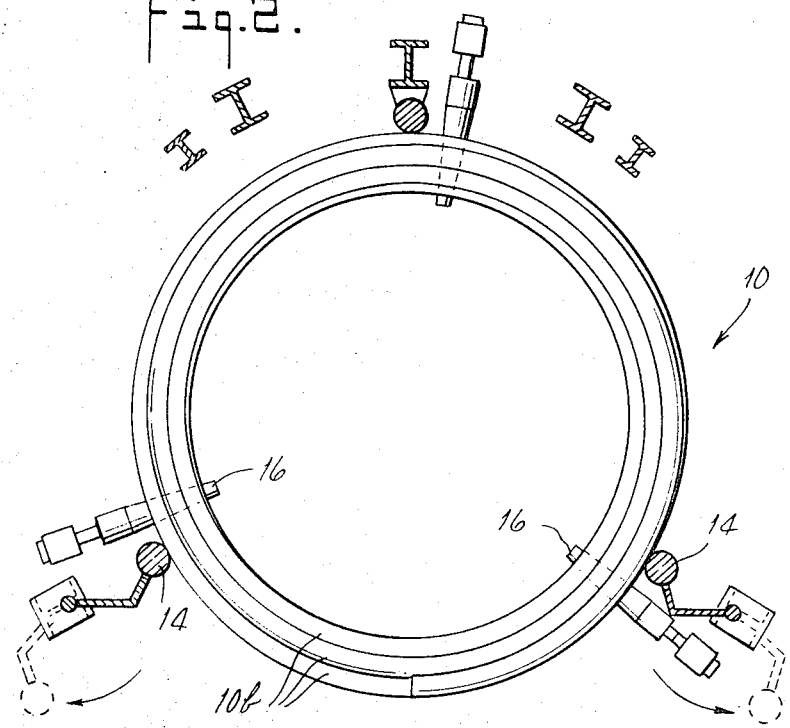
FIG. 2 is a sectional view taken along the line 2—2 of FIG. 1.

Referring to FIG. 1 of the drawings, there is shown a coil 10 of tubing arranged in an anti-friction coil cradle 12 such that the coil is free to rotate about its axis. The cradle 12 comprises a number of power-driven, vertical, elongated, anti-friction rollers 14 which maintain the coil in a vertical orientation and a number of radial, anti-friction support rollers 16 upon which the coil 10 is supported. Although the support rollers 16 are fixed to a supporting frame (not shown in FIG. 1), at least some of the vertical rollers 14 are free to pivot so that an entire coil 10 of tubing may be disposed in the cradle 12 from a side position (as best seen in FIG. 2). The support rollers 16 are tapered toward the axis of the coil 10 so that the tubing may be more readily threaded through the line (as directed below), so as to accommodate the difference in linear velocity of the tubing caused by the continuously varying diameter of the coil 10, and so that the coil 10 may be centered in the apparatus. The support rollers 16 are also power-driven so that the power requirements of the drive rollers (described below) are reduced. A motor 15 is provided for driving each vertical roller 14, while a motor 17 is provided for driving each support roller 16.

Figure 4:
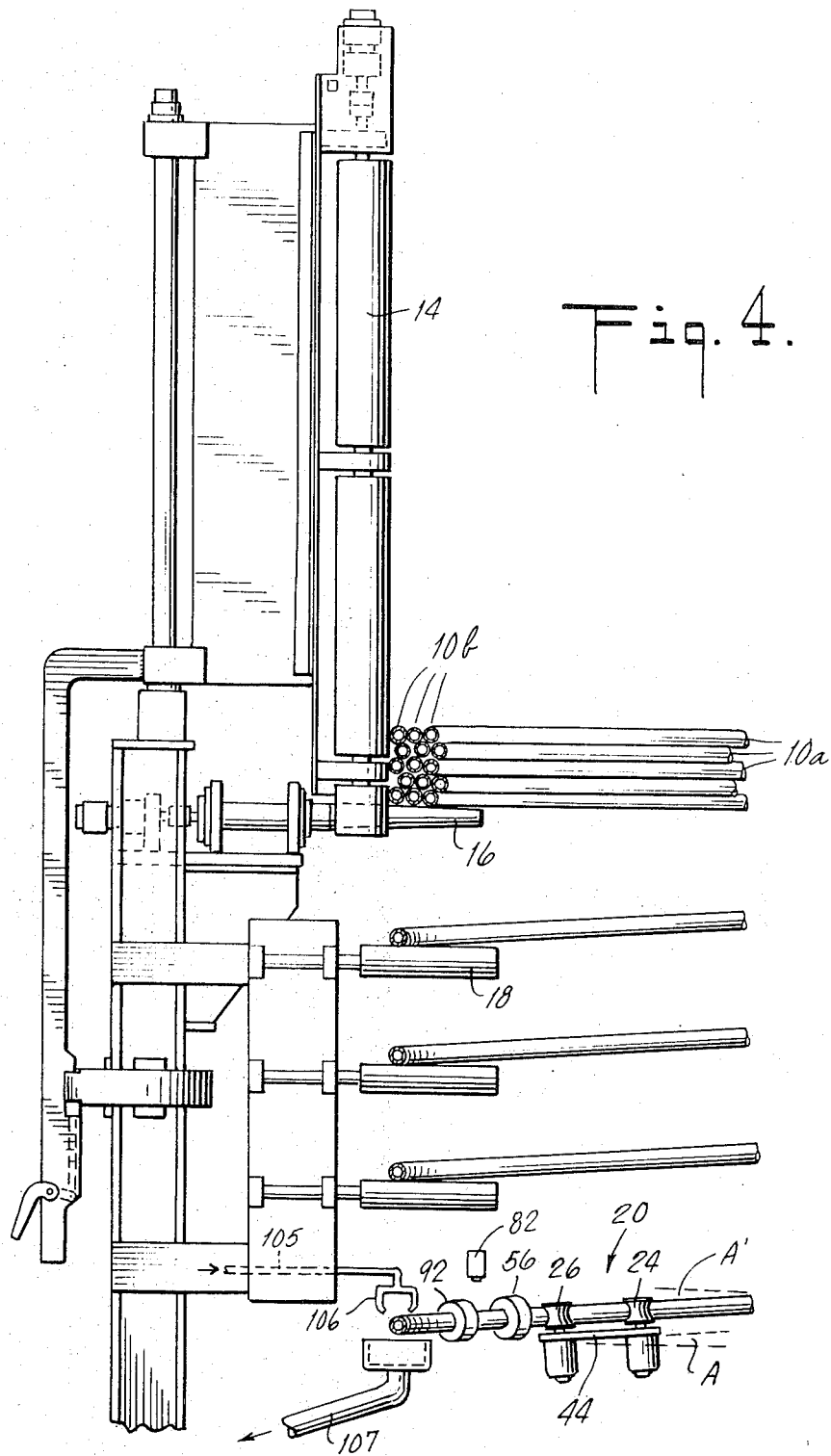
FIG. 4 is a detailed elevational view of the means for rotatably supporting and sequentially separating turns from a coil of tubing.

It should be noted that the present invention relates to the processing of any elongated material such as tubing, rod, wire, strip, etc., which is prebent and which retains the bending curvature. The invention is particularly suitable for the processing of heavy tubing, e.g. up to 2 in. I.D. steel tubing. The term "tubing" is to be construed generically. As seen in FIGs. 1, 2 and 4, the coil 10 of tubing is of a contaniuoue length arranged in pancake-like radial layers 10a, each layer 10a being a spiral made up of several concentric and coplanar convolutions 10b of tubing. Each convolution 10b of tubing within a radial layer 10a has a different radius of curvature, the result of being prebent to its particular radius of curvature. A representative method and apparatus for forming such a coil 10 of tubing is described in Meyfarth et al. copending U.S. Pat. application, Ser. No. 823,764, filed May 12, 1969, entitled "Coiling Method and Apparatus" (assigned to the assignee of the present invention).

While the coil 10 of tubing is rotatably supported on the support rollers 16, turns of tubing are separated sequentially from the coil in a direction axial of the coil as the coil is rotated about its axis. The apparatus is designed to take advantage of the natural fall of the coil 10. However, a plurality of horizontal idler rollers 18 are provided to assist the coil 10 toward the processing station 20 (described below) and to support the trailing end of the coil. The vertical spacing between the idler rollers 18 and the processing station (see FIG. 1) is such that the natural fall of the coil 10 is utilized to reduce the mechanical effort of feeding the tubing through the line, thereby preventing damage to the tubing and the coating applied thereto. Further, the processing station is inclined (see angle A in FIG. 4) to conform to the angle of fall (A' in FIG. 4) of the tubing.

Figure 9:
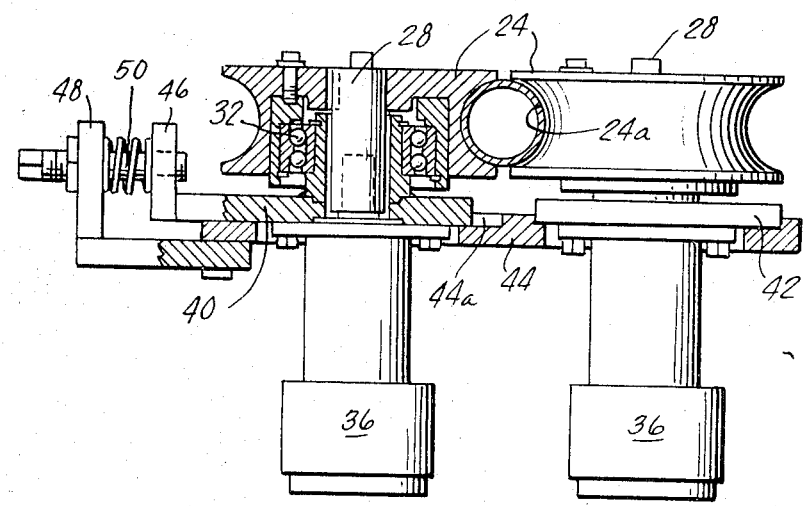
FIG. 9 is a sectional view taken along the line 9—9 of FIG. 5.

Located below the cradle 12 and the idler rollers 18 is a processing station 20 through which the axially separated tubing is guided. As best seen in FIGS. 5 and 9, a turn of tubing from the coil eventually reaches a point adjacent the processing station 20 as the turn is axially separated from the coil while the coil is continuously rotated. In order properly to direct the turn of tubing into the processing station 20, a guide device 22 is provided. The guide device 22 includes an alignment collar 23, a first pair of power-driven rollers 24 and a second pair of power-driven rollers 26. After passing through the alignment collar 23, which has a tapered central aperture 23a, the turn of tubing is engaged between the rollers of each respective pair and is driven therethrough when the rollers are rotated. Each drive roller 24, 26 is journalled on a respective shaft 28, 30 by means of respective journal bearings (see bearing 32 in FIG. 9 for shaft 28). The drive rollers 24, 26 are driven by respective hydraulic motors 36, 38 (FIG. 9) or the like.

One roller of each pair of drive rollers 24, 26 is mounted on an adjustable mounting plate 40 and the other roller of each pair is mounted on a similar mounting plate 42. The mounting plates 40, 42 are supported by a bed plate 44 (FIG. 9) having a keyway 44a therein in which the mounting plate 40 may move; the bed plate is set at an angle (angle A in FIG. 4) that coincides with the normal fall of the tubing from the coil 10. The drive rollers 24, 26 have peripheral grooves 24a and 26a, between which the tubing may be disposed.

An upstanding lug 46 is secured to the mounting plate 40 while another upstanding lug 48 is secured to the bed plate 44 and hence to the mounting plate 42. An adjusting screw 50 is disposed between the lugs 46, 48 and upon rotation of the screw 50 by any suitable means (such as a hand wheel) the lugs 46, 48 may be relatively adjusted. This results in movement of the mounting plate 40 in the keyway 44a of the bed plate 44, the distance between the rollers 24 or 26 of each pair being changed so as to accommodate varying sizes of tubing. The drive rollers 24, 26 may further be contoured to match the size of tubing to be processed to insure sufficient traction. The mechanism for adjusting the two pairs of rollers 24, 26 are substantially identical.

Also mounted on the mounting plates 40, 42 is a basket arrangement 52. The basket 52 is located between the pairs of rollers 24, 26 an serves to maintain the entering end of the tubing in proper positon as it passes between the two sets of rollers. The entire guide device 22 is pivotally secured about pivot point 22a to a supporting frame.

As the coiled tubing is comprised of turns prebent to varying radii of curvature (which should not be unbent), and as it is not desirable to change the position of the processing station 20, the guide device 22 is provided with means for changing the position of the tubing as it passes toward the fixed processing station. An hydraulic motor 54 is secured between the supporting frame and the bed plate 44, either the piston or the cylinder of the motor being fixed to the bed plate. Changing the position of the piston within the cylinder forces the guide device 22 to pivot about the pivot point 22a and hence the location of the turn of tubing that is present on the guide device may be changed (as described in more detail below) without changing the curvature of the tubing.

As best seen in FIGS. 6 and 7, the guided tubing passes out of the drive rollers 26 into the first stage of the processing station 20 — an undercoating applicator 56. Although the present invention is particularly useful in the application of plastic coatings to coiled steel tubing, it should be understood that many other operations might also be performed at the processing station 20 and it is not intended to limit the scope of the present invention to any particular type of processing. At the undercoating applicator 56 a hot undercoating or adhesive is applied to the exterior of the tubing prior to the appliction of the plastic coating material, so that the plastic coating will better adhere to the tubing. The undercoating applicator 56 is secured to the supporting frame by means of adjusting screws 58. Although it is intended that the applicator 56 be generally fixed relative to the frame, some freedom of movement is provided in the event that the moving tubing is slightly off its predetermined path through the applicator. A channel 59 is provided in the applicator 56 from its front wall 56a to its rear wall 56b through which the tubing may travel. A plurality of rollers 60 disposed at the front wall 56a (as best seen in FIG. 7), preferably made of Teflon, feed the tubing into the applicator. The applicator itself includes a simple enclosure 62 constituting an undercoating trap. Adhesive if flooded into the enclosure 62 with excessive adhesive leaving through an exit passage 64 by means of gravity. Any suitable undercoating may be applied to the tubing as it passes through the applicator 56. One undercoating material which has been successfully utilized is made by Farboil Company of Baltimore and is sold under the identifying designation of RSC 1400–5.

As the tubing leaves the undercoating applicator 56, it passes through a wiper ring 66 mounted in the rear wall 56b which serves to spread the undercoating evenly and to remove excess adhesive from the tubing. The wiper ring 66 has a central aperture 66a, which substantially corresponds to the outer diameter of the tubing. The wiper ring 66 is perferably formed of a relatively soft elastomeric material such as gum rubber. The size of the adhesive wiper ring 66 may be adjusted by a plurality of screws 68, that when tightened cause a steel collar 70 to compress the rubber and reduce the clearance between the wiper ring and the tubing. The rollers 60 are directly connected to the wiper ring 66 by a yoke member 72. Vertical motion of the directly connected rollers 60 and wiper ring 66 is permitted by means of pins 74 movable within vertically disposed slots 76 in the front and rear walls 56a, 56b. Pins 78 extending from the top wall 56c of the applicator 56 slide within horizontally disposed slots 80 in the supporting frame so that the applicator is permitted to move horizontally as well. Thus, the applicator 56 is permitted to float to some extent.

As seen in FIGS. 6 and 8, as the tubing leaves the undercoating applicator 56, it passes a sensing device 82. This device comprises a light source 84 and a corresponding photocell 86. Suitable electrical connections (not shown) permit the sensing device 82 to operate. One sensing device which has been successfully employed is made by North American Mfg. Co. of Cleveland, and is described in their Bulletin 5–041 (dated December 1967). The device is located so that when the edge of the tubing is in the correct lateral position, approximately 50 percent of the light emanating from the light source 84 toward the photocell 86 is blocked. The slightest movement of tubing away from the correct predetermined path will change the amount of light falling on the photocell. This causes a response in a control unit or amplifier 88 which controls a regulator 90 (see FIG. 3). The regulator 90 adjusts the flow of fluid into the hydraulic motor 54 secured to the guide device 22. Thus, movement of the tubing in one direction causes the hydraulic motor 54 to move to the guide device 22 and the tubing therein in the opposite direction and thus restore the tubing to its predetermined path. As the sensing is a continuous operation, the tubing is continuously directed into its predetermined path. Although the sensing device 82 could be disposed in any one of many locations, it is preferred that it be disposed between the undercoating applicator 56 and the plastic coating applicator (described in detail below) in order to position the tubing as best as possible in the center of the plastic coating applicator to ensure uniform thickness of coating on the tubing, despite the changing radii of curvature of the coil turns.

After the undercoating or adhesive coated tubing emerges from the undercoating applicator 56 and passes the sensing device 82, it enters a plastic coating applicator 92 which includes an extrusion die 94 having a channel 95 therethrough. There a plastic overcoat, such as a hot, linear, high-density polyethylene, is applied as a sheath to the exterior of the tubing. One plastic composition which has been successfully employed is Marlex — 5005, manufactured and sold by Phillips Chemical Co.

The extrusion die 94 is shown in section in FIG. 6. There it can be seen that the extrusion die includes a housing 96 to which a heated plastic composition is fed by way of a plastic inlet 98 under pressure from a source not shown. The extrusion die itself consists of a die annulus 100 and a concentric die cone 102 between which the plastic flows from the inlet 98. The die annulus 100 may be centered by screws 104,which can be tightened as necessary. The die 94 is necessarily short to accommodate the arc of the coiled tubing. As the tubing is driven through the extrusion die 94 at a rate somewhat in excess of that at which the plastic coating material is forced from the die, the tubing catches and carries the plastic with it and the plastic coating is stretched into tight engagement with the tubing being coated to form a sheath thereon.

Figure 3:
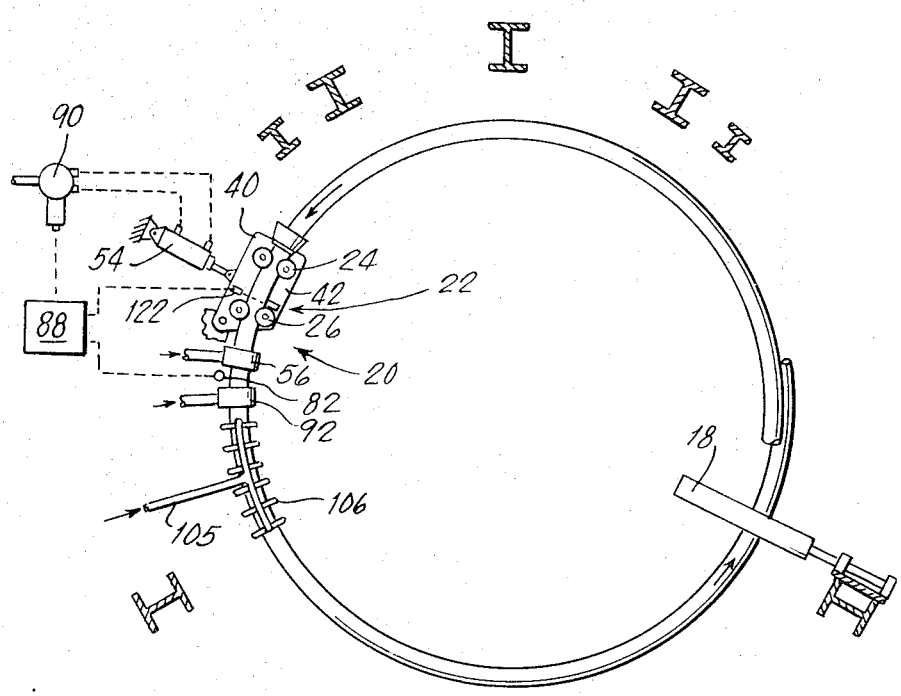
FIG. 3 is a sectional view taken along the line 3—3 of FIG. 1.

When the coated tubing leaves the extrusion die 94, the coating thereon is cooled and solidified by a coolant, such as water, which is directed against the coated tubing from coolant nozzles 106, as shown in FIGS. 3 and 4. The nozzles 106 are fed by a line 105 and the used water is drained by a line 107. The water floods the polyethylene coating to form a tight-fitting sheath over the tubing.

The coated tubing is then directed into a coil-receiving drum 108 (as shown in FIG. 1) without further intermediate handling by any guide rollers. The natural fall of the tubing is used to position the tubing in the drum; omission of intermediate guide rollers allows the coating to harden without danger of damage thereto by contact. The drum 108 is mounted for rotation under the impetus of the moving tube and is comprised of a bottom portion 110 and a plurality of vertically extending support rods 112. A series of casters 114,mounted under the bottom portion 110 along the periphery thereof, enables the drum to rotate. The drum 108 is rotatably mounted upon a table 116 which is provided with wheels 118 so that the table may be moved into and out of coil-receiving position,and with jacks 120 so that the table may be fixed in place in its desired location. It may be advantageous to apply a positive driving force to the drum so that it rotates with the coil 10 of tubing.

Figure 10:
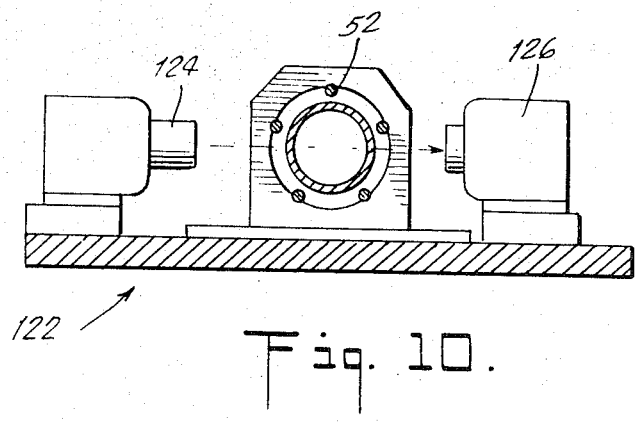
FIG. 10 is a sectional view taken along the line 10—10 of FIG. 5.

After the trailing end of the coil 10 of tubing has passed through the processing station 20, the guide device 22, which is controlled by the sensing device 82, may be prevented from continuing to attempt properly to locate the tubing. This is accomplished by means of a second sensing device 122 located on the guide device 22 in the area of the basket 52 between the pairs of rollers 24, 26. As best seen in FIGS. 5 and 10, the second sensing device 122 comprises a light source 124 and a corresponding photocell 126. Suitable electrical connections (not shown) permit the sensing device 122 to operate. Similar in construction to the sensing device 82, the second sensing device 122 is located, however, so that when the tubing is passing through the processing station 20, the light emanating from the light source 124 and directed toward the photocell 126 is totally blocked. When the trailing end of the tubing passes through the guide device 22 and subsequently through the processing station 20, the light will then fall upon the photocell. This will cause a response in the same control unit or amplifier 88 which operates the regulator 90 (see FIG. 3). Th hydraulic motor 54 used for directing the guide device 22 will be overridden so that the guide device 22 will not be permitted to continually attempt to direct a non-existent tubing. The hydraulic motor 54 will further be secured in position against movement. Only one control unit 88, regulator 90, and hydraulic motor 54 are needed for the systems of both sensing devices 82 and 122. It is preferred to locate the second sensing device 122 directly on the guide device 22, so that the guide device will become inoperative immediately after passage of the trailing end of the tubing.

OPERATION

In initiating the coating operation, the leading end of the coil 10 of tubing is separated from the coil in the direction of the coil axis as it passes the horizontal support rollers 16. The separated end of the tubing is allowed to fall upon the series of horizontal idler rollers 18 and thence naturally until it reaches the vicinity of the processing station 20. There the tubing is directed into the guide device 22 through the alignment collar 23. The pairs of drive rollers 24, 26 guide the tubing into the undercoating applicator 56 where a coating of adhesive is applied thereto. The wiper ring 66 removes excessive adhesive from the tubing.

The tubing then passes the sensing device 82 which determines whether the tubing is following a predetermined path, e.g. through the center of the processing station. If the tubing has deviated from the path, the sensing device 82 operates the hydraulic motor 54, through the control unit or amplifier 88 and the regulator 90, that repositions the guide device 22 to relocate the tubing thereon.

Subsequently, the moving tubing passes through the plastic coating applicator 92, where the extrusion die 94 applies a plastic film or sheath to the tubing over the adhesive undercoat. Then the tubing passes coolant nozzles 106 where water is sprayed thereon to tighten the plastic sheath about the tubing. The coil 10 of coated tubing is collected in the coil-receiving drum 108.

EXAMPLE

Four partial variable diameter coils of 2-⅜ in. O.D. tubing (2 in. I.D. tubing) were coated using the apparatus of the present invention. The coil 10 had a maximum diameter of 84 in. and a minimum diameter of 68 in. Use of the sensing device 82 eliminated the need for any variation in the die opening of the extrusion die 94. Adhesive to a thickness of about 20 mils was applied to the tubing by the undercoating applicator 56. The adhesive was of the type described above, made by Farboil Company.

The thickness of a polyethylene sheath extruded on the tubing by the extrusion die 94 ranged between 40 and 44 mils at slow speed and 17 to 20 mils at high speed. The polyethylene was of the type described above, sold under the trademark Marlex–5005. A polyethylene sheath thickness of 30 to 35 mils is considered acceptable for large-diameter coiled steel tubing. The general quality of the coating appeared excellent, although no physical properties other than thickness were measured. Minor variations in the thickness around the sheath were observed, although this was readily correctible by internal adjustments in the extrusion die 94. The curvature of the tubing was not changed during the operation.

The present invention thus allows a continuous coating process to be performed on coiled tubing or the like without the necessity of unbending the same. Moreover, the present invention allows a coiled tubing having turns prebent to varying radii of curvature to be continuously coated to an even thickness as the tubing is maintained on a predetermined path through the coating apparatus until the trailing end of the tubing passes through the apparatus. The time and labor-saving advantage accruing from the use of a coil-feeding apparatus, such as described above, can be readily appreciated.

I claim:

1. In a method of processing coiled tubing and the like having turns prebent to varying radii of curvature, including the steps of:
    a. rotatably supporting a coil of such tubing;
    b. sequentially separating the turns of tubing from said coil in a direction axial of said coil while rotating said coil about its axis; and
    c. guiding said axially separated tubing into and through a processing station; the improvement comprising:
    d. maintaining said tubing on a predetermined path through said processing station without changing the bending of the turns in the coil by:
        1. sensing deviation of said tubing from said predetermined path through said processing station; and
        2. directing said tubing into said predetermined path through said processing station in response to said sensed deviation.

2. A method according to claim 1, wherein the step (d) further includes:
    3. sensing the trailing end of said tubing upon its passage through said processing station; and
    4. discontinuing directing of said tubing under substep (2) upon sensing passage of the trailing end of said tubing past a preestablished location.

3. A method according to claim 2, wherein discontinuing the directing of the tubing fixes the guiding of the tubing into and through the processing station to prevent further changes in the path of movement into and through the processing station.

4. A method according to claim 1, wherein the processing station applies an adhesive undercoat and a plastic overcoat to said tubing, and wherein said deviation sensing is carried out at a location between the places at which the undercoat and overcoat are applied to the tubing.

5. A method according to claim 4, including sensing the trailing end of said tubing before it reaches the place at which the undercoat is applied, and discontinuing any further directing of said tubing under substep (2) upon such sensing of the trailing end of said tubing.

6. A method of processing coiled tubing and the like having turns prebent to varying radii of curvature, comprising the steps of:
   a. rotatably supporting a coil of such tubing;
   b. sequentially separating the turns of tubing from said coil in a direction axial of said coil while rotating said coil about its axis without unbending the tubing;
   c. guiding the axially separated tubing into and through a processing station axially spaced from the coil without unbending the tubing; and
   d. receiving said processed tubing directly from the processing station in a receiving means axially spaced from the processing station without contact of the tubing with any structure between the processing station and the receiving means, and providing for rotation of said receiving means to recoil the tubing without changing the bending of the tubing.

7. A method according to claim 6, wherein during the step (c) the tubing is maintained on a predetermined path through the processing station by:
   1. sensing deviation of said tubing from said predetermined path through said processing station; and
   2. directing said tubing into said predetermined path through said processing station in response to said sensed deviation.

* * * * *